US011644309B2

(12) United States Patent
Carlén et al.

(10) Patent No.: US 11,644,309 B2
(45) Date of Patent: *May 9, 2023

(54) GEODETIC SURVEYING WITH TIME SYNCHRONIZATION

(71) Applicant: Trimble AB, Danderyd (SE)

(72) Inventors: Johan Carlén, Danderyd (SE); Mikael Nordenfelt, Danderyd (SE); Christian Grässer, Danderyd (SE)

(73) Assignee: Trimble AB, Danderyd (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/384,053

(22) Filed: Jul. 23, 2021

(65) Prior Publication Data
US 2022/0011101 A1 Jan. 13, 2022

Related U.S. Application Data

(63) Continuation of application No. 16/505,473, filed on Jul. 8, 2019, now Pat. No. 11,092,434, which is a
(Continued)

(51) Int. Cl.
G01C 1/04 (2006.01)
G01C 15/00 (2006.01)
(Continued)

(52) U.S. Cl.
CPC ............. *G01C 1/04* (2013.01); *G01C 15/006* (2013.01); *G01C 15/06* (2013.01); *G01J 11/00* (2013.01); *G01S 19/51* (2013.01)

(58) Field of Classification Search
CPC ........ G01C 1/04; G01C 15/06; G01C 15/002; G01C 15/004; G01C 15/006
(Continued)

(56) References Cited

U.S. PATENT DOCUMENTS 5,901,236 A 5/1999 Mizui
6,608,688 B1 8/2003 Faul et al.
(Continued)

FOREIGN PATENT DOCUMENTS

CN 1761855 A 4/2006
CN 101965498 A 2/2011
(Continued)

OTHER PUBLICATIONS

International Search Report and Written Opinion for Application No. PCT/EP2017/053252, dated Jan. 17, 2018, 18 pages.
(Continued)

Primary Examiner — George B Bennett
(74) Attorney, Agent, or Firm — Kilpatrick Townsend & Stockton LLP

(57) ABSTRACT

The present disclosure provides a method for determining a direction to a geodetic target from a geodetic instrument. The method includes emitting an optical pulse from the geodetic target, capturing a first image and a second image of the geodetic target using a camera arranged at the geodetic instrument, obtaining a difference image between the first image and the second image, and determining a direction to the geodetic target from the geodetic instrument based on the position of the optical pulse in the difference image. The method further includes synchronizing the geodetic instrument and the geodetic target for emitting the optical pulse concurrently with the capturing of the first image and nonconcurrently with the capturing of the second image. The present disclosure also provides a geodetic instrument, a geodetic target and a geodetic surveying system.

20 Claims, 4 Drawing Sheets

Related U.S. Application Data continuation of application No. PCT/EP2017/053252, filed on Feb. 14, 2017.

(51) Int. Cl.
*G01C 15/06* (2006.01)
*G01J 11/00* (2006.01)
*G01S 19/51* (2010.01)

(58) Field of Classification Search
USPC .......................................... 33/1 T, 290–296
See application file for complete search history.

(56) References Cited

U.S. PATENT DOCUMENTS

| | | | |
|---|---|---|---|
| 7,804,051 B2* | 9/2010 | Hingerling | G01C 15/06 |
| | | | 250/206.1 |
| 8,553,212 B2 | 10/2013 | Jaeger et al. | |
| 9,846,035 B2* | 12/2017 | Kotzur | G01C 15/02 |
| 11,092,434 B2 | 8/2021 | Carlén | |
| 2006/0012777 A1 | 1/2006 | Talbot et al. | |
| 2008/0252907 A1 | 10/2008 | Sehr | |
| 2012/0195060 A1 | 8/2012 | Gregory et al. | |
| 2012/0272536 A1 | 11/2012 | Nishita | |
| 2015/0185018 A1 | 7/2015 | Hesch et al. | |
| 2015/0276402 A1 | 10/2015 | Grasser et al. | |
| 2015/0316375 A1 | 11/2015 | Winter | |
| 2016/0033270 A1 | 2/2016 | Von Matern | |
| 2018/0095174 A1 | 4/2018 | Mertz et al. | |
| 2018/0329040 A1 | 11/2018 | Ohtomo et al. | |
| 2019/0154805 A1 | 5/2019 | Ohtomo et al. | |
| 2020/0080842 A1 | 3/2020 | Rabot et al. | |
| 2020/0096610 A1* | 3/2020 | Jensen | G01C 15/06 |
| 2020/0105043 A1 | 4/2020 | Yasutomi et al. | |
| 2020/0191569 A1* | 6/2020 | Zimmermann | G01C 15/006 |
| 2020/0293037 A1 | 9/2020 | Kauppinen et al. | |
| 2021/0055103 A1 | 2/2021 | Sasaki | |
| 2021/0088332 A1 | 3/2021 | Clarke | |
| 2021/0372768 A1* | 12/2021 | Müller | G01B 11/002 |
| 2022/0011105 A1* | 1/2022 | Hotz | G01C 1/02 |
| 2022/0074764 A1* | 3/2022 | Müller | G06T 7/70 |

FOREIGN PATENT DOCUMENTS

| | | |
|---|---|---|
| CN | 102341671 A | 2/2012 |
| CN | 103415780 A | 11/2013 |
| CN | 103477187 A | 12/2013 |
| CN | 103487039 A | 1/2014 |
| CN | 103827631 A | 5/2014 |
| CN | 104584089 A | 4/2015 |
| CN | 105738930 A | 7/2016 |
| KR | 10-2016-0086244 A | 7/2016 |
| WO | 99/52094 A1 | 10/1999 |
| WO | 2008/145158 A1 | 12/2008 |

OTHER PUBLICATIONS

U.S. Appl. No. 16/505,473 Notice of Allowance dated Apr. 23, 2021, 9 pages.

* cited by examiner

GEODETIC SURVEYING WITH TIME SYNCHRONIZATION

CROSS-REFERENCE TO RELATED APPLICATIONS

The present application is a continuation of U.S. application Ser. No. 16/505,473, filed Jul. 8, 2019, which is a continuation of International Application No. PCT/EP2017/053252, filed Feb. 14, 2017, the contents of which are incorporated herein by reference in their entirety for all purposes.

TECHNICAL FIELD

The present disclosure generally relates to the field of land surveying. In particular, the present disclosure relates to a method for determining a direction to a geodetic target from a geodetic instrument. The present disclosure relates also to a geodetic instrument, a geodetic target and a geodetic surveying system.

BACKGROUND

A geodetic instrument, such as a total station or a theodolite, may be used to determine directions to and/or positions of one or more geodetic targets. The targets may for example be used for stake outs on construction sites, or positioned on construction vehicles operating on the construction site in order to guide these vehicles in their operation.

On larger construction sites, multiple targets may be present at the same time, and/or the geodetic targets may be located at rather long distances from the geodetic instrument. Therefore, there is a need for improved geodetic instruments, geodetic targets, and methods for operating these to accurately and efficiently determine directions to and/or positions of geodetic targets.

SUMMARY

To at least partially fulfill the above requirements, the present disclosure seeks to provide at least one improved method, an improved geodetic instrument and an improved geodetic target for determining a direction to the geodetic target from the geodetic instrument.

To achieve this, methods, a geodetic instrument and a geodetic target as defined in the independent claims are provided. Further embodiments of the present disclosure are provided in the dependent claims.

According to a first aspect, a method for determining a direction to a geodetic target from a geodetic instrument is provided. In the method, an optical pulse may be emitted towards the geodetic instrument from the geodetic target, and a first image and a second image of the geodetic target may be captured using at least one imaging device arranged at the geodetic instrument. The geodetic instrument and the geodetic target may be synchronized for emitting the optical pulse concurrently with the capturing of the first image, and for emitting the optical pulse nonconcurrently with the capturing of the second image. A difference image between the first image and the second image may be obtained, and the direction to the geodetic target from the geodetic instrument may be determined based on a position of the optical pulse in the difference image.

According to a second aspect, a method implemented by a geodetic instrument for determining a direction to a geodetic target configured to identify itself by emitting an optical pulse is provided. In the method, a first image and a second image of the geodetic target may be captured using at least one imaging device arranged at the geodetic instrument. The geodetic instrument and the geodetic target may be synchronized for capturing the first image concurrently with emission of the optical pulse by the geodetic target, and for capturing the second image nonconcurrently with emission of the optical pulse by the geodetic target. A difference image between the first image and the second image may be obtained, and the direction to the geodetic target from the geodetic instrument may be determined based on a position of the optical pulse emitted by the geodetic target in the difference image.

According to a third aspect, a geodetic instrument is provided. The geodetic instrument may include a processing unit that may be configured to cause at least one imaging device to capture at least a first image and a second image of a geodetic target configured to identify itself by emitting an optical pulse. The processing unit may be further configured to synchronize the at least one imaging device to capture the first image concurrently with emission of the optical pulse by the geodetic target, and to capture the second image nonconcurrently with emission of the optical pulse by the geodetic target. The processing unit may also be configured to receive the first image and the second image from the at least one imaging device, to obtain a difference image between the first image and the second image, and to determine a direction to the geodetic target from the geodetic instrument based on a position of the optical pulse emitted by the geodetic target in the difference image.

According to a fourth aspect, a geodetic target configured to identify itself to a geodetic instrument by emitting an optical pulse is provided. The geodetic target may include an optical source that may be configured to emit the optical pulse. The geodetic target may further include a processing unit that may be configured to synchronize the optical source to emit the at least one optical pulse concurrently with a capturing of a first image by the geodetic instrument, and nonconcurrently with a capturing of a second image by the geodetic instrument.

The methods, the geodetic instrument and the geodetic target of the above aspects are advantageous for example in that a more reliable identification of a geodetic target in terms of unambiguity may be performed. In addition to the optical pulse emitted by the geodetic target, the scene to be surveyed may contain additional light originating from interference sources, such as for example light from vehicles, buildings, traffic lights or light from the sun. By obtaining the difference image between the first image and the second image, such interference light may be filtered out and rejected by the geodetic instrument, thereby reducing or eliminating the risk of the geodetic instrument becoming confused about whether a captured light originates from the geodetic target or not.

In addition, by synchronizing the emission of the optical pulse and the capturing of the first image and the second image as described above, the optical pulse may only have to be emitted during a short time when the imaging device captures the first image. This may allow for the duration of the optical pulse to be reduced, and for the amplitude of the optical pulse to be increased while still keeping the power consumption of the optical source within its thermal limits. With an increased amplitude of the optical pulse, the distance the pulse may travel before getting too attenuated to be detected by the imaging device arranged at the geodetic instrument may thereby be increased, which may allow for an increased measuring distance between the geodetic instrument and the geodetic target.

According to one embodiment, the synchronizing may include receiving a signal indicative of a common event. A signal indicative of the common event may for example be a radio signal, an optical signal or an electronic signal. The signal may contain e.g. a pulse that indicates the common event, or the signal may be more complex and contain many pulses and/or codes which together indicate the common event. It is also envisaged that the signal may be a mechanical signal, where e.g. a pulse is transferred using for example a shock wave or one or more other mechanical forces/impulses.

According to one embodiment, the signal indicative of the common event may include an electromagnetic signal or an electric signal. With electromagnetic signal, it is envisaged e.g. a radio signal, a wireless network signal, an optical signal or similar. With electric signal, it is envisaged a signal propagated within for example a cable or a wire.

According to one embodiment, the signal indicative of the common event may include a global navigation satellite system, GNSS, code. Such a signal may originate from e.g. a GPS, GLONASS or BeiDou satellite, and be received by e.g. the geodetic instrument or the geodetic target and processed using e.g. an integrated circuit adapted for such a purpose.

According to one embodiment, the signal indicative of the common event may be a single electric pulse or a single electromagnetic pulse. By using a single pulse, the need for more complicated integrated circuitry may be reduced.

According to one embodiment, the signal indicative of the common event may be received by the geodetic instrument from the geodetic target. In one embodiment, the signal indicative of the common event may be received by the geodetic target from the geodetic instrument. In a further embodiment, the signal indicative of the common event may be received by the geodetic target and the geodetic instrument from a third party device. A third party device may for example be a satellite, a radio tower broadcasting a time signal, or other broadcasting equipment. A third party device may also be an additional geodetic instrument or an additional geodetic target.

According to one embodiment, the first image and the second image may be captured within a specific time interval. The specific time interval may for example correspond to at most one frame readout time plus two times a frame exposure time of the at least one imaging device. By capturing the first image and the second image close together in time, the effect of changes occurring in the scene to be surveyed may be reduced. Such changes may for example be something that is moving in the scene. A specific time interval corresponding to one frame exposure time for capturing of the first image, one frame readout time for readout of the captured first image, and one frame exposure time for capturing of the second image may result in a minimal elapsed time between the capturing of the two images with respect to the performance of the imaging device.

A specific interval corresponding to at most two times a frame exposure time plus one frame readout time of the at least one imaging device is only an example providing a further benefit of the present disclosure. In certain scenarios and situations, the specific time interval may be longer.

Herein, a frame exposure time may correspond to the time taken by the imaging device to capture an image (i.e. to collect enough photons at e.g. an imaging sensor in the imaging device), while a frame read out time may correspond to the time required to read out the image information from the imaging sensor.

According to one embodiment, the first image may be captured by a first imaging device, and the second image may be captured by a second imaging device. With two imaging devices, the first image and the second image may be captured simultaneously or within a time interval shorter than e.g. a frame readout time of one of the imaging devices. This may further help to reduce the effect of changes in the scenery, such as movement of vehicles, movement due to wind, or movements due to other causes.

According to one embodiment, the capturing of the first image and the second image may be repeated to capture a plurality of first images and a plurality of second images in an interleaved fashion. Here, an "interleaved fashion" means that the images are captured such that a first image is followed by a second image, and that this second image in turn is followed by another first image and so on in an alternating manner. By capturing a plurality of first images and second images, multiple difference images may be obtained and a direction to the geodetic target from the geodetic instrument may be determined based on the position of the optical pulse in multiple difference images. The geodetic target may be tracked over time, and if, for example, the geodetic target is moving relative to the geodetic instrument, the movement of the geodetic target may be determined from the determined directions over time.

According to one embodiment, the plurality of first images may be captured at a rate corresponding to a rate at which the geodetic target may be configured to emit a plurality of subsequent optical pulses. By capturing the plurality of first images at the same rate at which the geodetic target emits pulses, each pulse may be captured and the direction to (or the position of) the geodetic target may be determined by the geodetic instrument over time and more accurately.

According to one embodiment, the plurality of first images and second images may be captured at a combined rate corresponding to twice the rate at which the geodetic target may be configured to emit the plurality of subsequent optical pulses. By capturing the plurality of first images and second images at a combined rate twice that at which the geodetic target emits optical pulses, each first image may be captured such that it contains an optical pulse emitted by the geodetic target, and each second image may be captured such that it does not contain an optical pulse emitted by the geodetic target. An image "containing" or "not containing" an optical pulse may be interpreted as the image containing or not containing any data representative of the optical pulse, respectively.

According to one embodiment, a time interval between capturing of a first image and capturing of an immediately preceding second image may be equal to a time interval between capturing the first image and capturing of an immediately succeeding second image. Here, an image is said to be "immediately preceding/succeeding" another image if no other images are captured by the geodetic instrument (using the at least one imaging device) between the images.

According to one embodiment, the plurality of first images and second images may be captured at a combined rate corresponding to at least 60 Hz. By capturing the first and second images at a combined rate of 60 Hz or more, the scenery to be surveyed and the geodetic target may be approximated as static over the interval during which a first image and a second image are captured.

According to one embodiment, a frame exposure time of the at least one imaging device may be shorter than or equal to a duration of the optical pulse emitted by the geodetic target.

Generally, in order to capture at least a part of the emitted optical pulse, it may be appreciated that the frame exposure at least partly overlaps with the optical pulse in time.

If the exposure of a frame and the emission of the optical pulse are aligned in time, a frame exposure time that is equal to the duration of the optical pulse may allow for a large or maximal number of photons in the optical pulse to be captured by the imaging device without any exposure during times when no photon is emitted.

A frame exposure time that is shorter than the duration of the optical pulse may allow for a sufficient number of photons in the optical pulse to be captured with no exposure during times when no photon is emitted, even in the presence of a misalignment between the exposure of the frame and the emission of the optical pulse which is small enough that the full exposure is still contained within the interval of the duration of the optical pulse.

According to one embodiment, a method as described above may further include synchronizing the geodetic instrument with the geodetic target and a second geodetic target configured to identify itself by emitting an optical pulse for capturing the first image nonconcurrently with emission of the optical pulse by the second geodetic target. By synchronizing the geodetic target and the second geodetic target such that they do not emit pulses at the same time, both targets may be tracked by the geodetic instrument, and directions to both targets may be determined from multiple difference images. As the first image is captured while only one pulse is emitted, the geodetic instrument may identify the optical pulse in the first image and/or a second image captured nonconcurrently with the emission of the optical pulse from the geodetic target more easily, even in the presence of more than one geodetic target.

According to one embodiment, a method as described above may further include capturing a third image of the geodetic target and the second geodetic target using at least one imaging device arranged at the geodetic instrument. A method as described above may also include synchronizing the geodetic instrument with the geodetic target and the second geodetic target for capturing the third image concurrently with emission of the optical pulse by the second geodetic target and nonconcurrently with emission of the optical pulse by the geodetic target. A method as described above may further include obtaining a second difference image between the third image and an image captured nonconcurrently with the emission of the optical pulse by the second geodetic target, and determining a direction to the second geodetic target from the geodetic instrument based on a position of the optical pulse emitted by the second geodetic target in the second difference image. As described, such a method is advantageous in that both the geodetic target and the second geodetic target may be identified by the geodetic instrument from different difference images. The difference image may be used to obtain a direction to the geodetic target, and the second difference image may be used to obtain a direction to the second geodetic target. As described above, the geodetic instrument may in this way track multiple targets, and the capturing of the images as described above may help to reduce cross talk between multiple targets and allow for more convenient identification of each target.

According to one embodiment, synchronizing the geodetic instrument with the geodetic target as in a method described above may further include establishing a time reference common to the geodetic instrument and the geodetic target, and obtaining information about allocation of a set of non-overlapping time slots including at least a first time slot and a second time slot. The optical pulse may be emitted by the geodetic target within the first time slot, and the first image and the second image may be captured by the geodetic instrument within the first time slot and the second time slot, respectively. By establishing time slots as described above, a geodetic target may be assigned a subset of time slots (e.g. the first time slot) in which it is allowed to emit an optical pulse. When the geodetic instrument captures images, it may take the given allocation of time slots into account in order to capture at least one image that will contain an optical pulse emitted by the geodetic target, and at least one image that will not contain an optical pulse emitted by the geodetic target, and subsequently obtain a corresponding difference image and determine a direction to the geodetic target. To obtain information about allocation of the set of non-overlapping time slots, the geodetic instrument and the geodetic target may for example be provided with information indicative of the distribution of time slots in time, such as when a certain time slot starts and when it ends. For a plurality of time slots, the information may e.g. indicate when the first time slot in the plurality of time slots starts, how long each time slot is and how far in time they are separated. It is envisaged that time slots belonging to the same plurality of time slots may also be spaced unevenly in time, and the information indicative of the allocation may then contain the start and duration of each time slot within the plurality of time slots, or other information which enables e.g. the geodetic instrument or geodetic target to calculate the start and duration of time slots. The allocation of the time slots may be static, and the information indicative of the allocation of the time slots may be provided to the geodetic target and/or geodetic instrument during fabrication of the devices, during setup before operation or during operation itself. The allocation of the time slots may in some embodiments be dynamic, and changes of the allocation may be communicated to the geodetic target and/or geodetic instrument when necessary. The information may be provided in connection with, such as before, a change of allocation, or information may be provided from which the geodetic target and/or geodetic instrument may calculate when a change will occur and to what extent. At longer distances, it may for example be advantageous with longer time slots to provide an improved integrated signal. At shorter distances, it may for example be advantageous with shorter time slots to provide e.g. a faster reaction time. Depending on the distance between the geodetic instrument and the geodetic target, the length of one or many time slots may be adjusted accordingly.

According to one embodiment, synchronizing the geodetic instrument with the geodetic target and the second geodetic target as in a method described above may include establishing a time reference common to the geodetic instrument, the geodetic target and the second geodetic target, and obtaining information about allocation of a third time slot in the set of non-overlapping time slots. The optical pulse may be emitted by the second geodetic target within the third time slot. By assigning a subset of time slots (e.g. the third time slot) to the second geodetic target, where this subset of time slots does not overlap with e.g. a subset of time slots assigned to the geodetic target, the geodetic targets may both emit pulses which do not collide with each other in time.

According to one embodiment, the third image of the geodetic target and the second geodetic target may be captured by the geodetic instrument within the third time slot. By taking the assignment of time slots into account, the geodetic instrument may capture at least one image that contains an optical pulse emitted by the geodetic target only, and at least one image that contains an optical pulse emitted by the second geodetic target only. Since the assigned subsets of time slots are non-overlapping, the geodetic target may also capture at least one image which does not contain any pulse emitted by the geodetic target, and at least one image which does not contain any pulse emitted by the second geodetic target. These images may be a same image, or be different images, as long as corresponding difference images may be obtained and from which directions to the geodetic target and the second geodetic target may be determined. It is envisaged that the difference image may be obtained from an image which contains a pulse from a geodetic target and an image which contains no pulse from any geodetic target. It is also envisaged that a difference image may be obtained from an image which contains a pulse from a geodetic target and an image which contains one or more pulses from one or more different geodetic targets, as long as an optical pulse from the geodetic target to which a direction from the geodetic instrument is to be determined is not contained in both images used to obtain the difference image.

According to one embodiment, a method as described above may include determining a position of the geodetic target relative to the geodetic instrument based on the position of the optical pulse emitted by the geodetic target in the difference image. The geodetic instrument may determine the position of a geodetic target if, for example, a direction to the geodetic target is known. If, for example, the geodetic instrument is aware of its own position (e.g. by using satellite navigation), and if the geodetic instrument is also aware of the distance to the geodetic target (obtained by using e.g. a laser range finder or similar), the position of the geodetic target may be calculated by the geodetic instrument based on the determined direction to the geodetic target from the geodetic target. If the geodetic instrument is not aware of its own position, the geodetic instrument may however still at least determine the position of the geodetic target relative to the geodetic instrument.

According to one embodiment, a geodetic instrument as described above may further include a receiver configured to receive a signal indicative of a common event, and the processing unit of such a geodetic instrument may be configured to synchronize the at least one imaging device based on the received signal indicative of the common event.

According to one embodiment, the receiver may be a GNSS receiver. A GNSS receiver may be for example a time reference module, or a common GPS, GLONASS and/or BeiDou receiver, and may be integrated into e.g. a processing unit or be a separate circuit that may communicate with a processing unit.

According to one embodiment, the at least one imaging device may be a digital camera. Using a digital camera may reduce the need for more expensive imaging devices.

According to one embodiment, the processing unit of a geodetic instrument as described in the above embodiment may be configured to operate according to a method as defined in any of the above embodiments.

According to one embodiment, a geodetic target as described above may further include a receiver configured to receive a signal indicative of a common event, and a processing unit of a geodetic target as described above may be configured to synchronize the optical source based on the received signal indicative of the common event.

According to one embodiment, the receiver of a geodetic target as described above may be a GNSS receiver.

According to one embodiment, a geodetic surveying system may be provided. The geodetic surveying system may include a geodetic instrument as defined in any of the above embodiments described above and at least one geodetic target as defined in any of the above described embodiments.

According to one embodiment, the geodetic surveying system may include a third-party device configured to transmit a signal indicative of a common event. The geodetic instrument and the at least one geodetic target may be configured to receive the signal indicative of the common event from the third-party device. The processing unit of the geodetic instrument may be configured to synchronize the at least one imaging device, and the processing unit of the geodetic target may be configured to synchronize the at least one optical source, based on the received signal indicative of the common event.

The present disclosure relates to all possible combinations of features recited in the claims. Further, any embodiment described with reference to a method according to the first aspect or the second aspect of the present disclosure may be combinable with any one of the embodiments described with reference to the geodetic instrument according to the third aspect and/or the geodetic target according to the fourth aspect of the present disclosure, or vice versa.

Further objects and advantages of the various embodiments of the present disclosure will be described below by means of exemplifying embodiments.

BRIEF DESCRIPTION OF THE DRAWINGS

Exemplifying embodiments will be described below with reference to the accompanying drawings, in which:

FIGS. 3a, 3b, 3c, 3d and 3e illustrate examples of how to capture images and emit optical pulses in accordance with one or more embodiments of the present disclosure.

Figure 1A:
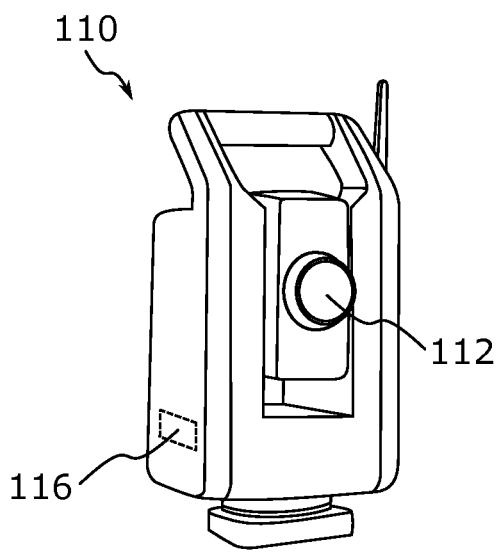
FIG. 1a illustrates a geodetic instrument.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the figures, the sizes of elements and regions may be exaggerated for illustrative purposes and, thus, are provided to illustrate the general structures of the embodiments.

DETAILED DESCRIPTION

Exemplifying embodiments will now be described more fully hereinafter with reference to the accompanying drawings. The drawings show currently preferred embodiments, but the invention may, however, be embodied in many different forms and should not be construed as limited to the embodiments set forth herein; rather, these embodiments are provided for thoroughness and completeness, and fully convey the scope of the present disclosure to the skilled person.

Figure 1B:
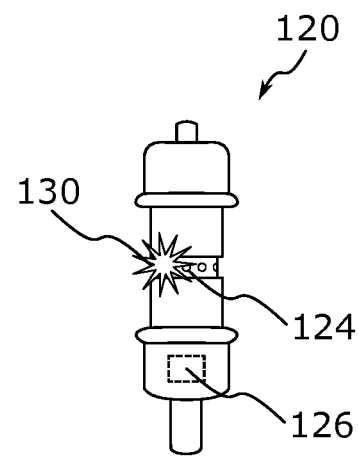
FIG. 1b illustrates a geodetic target.
Figure 1C:
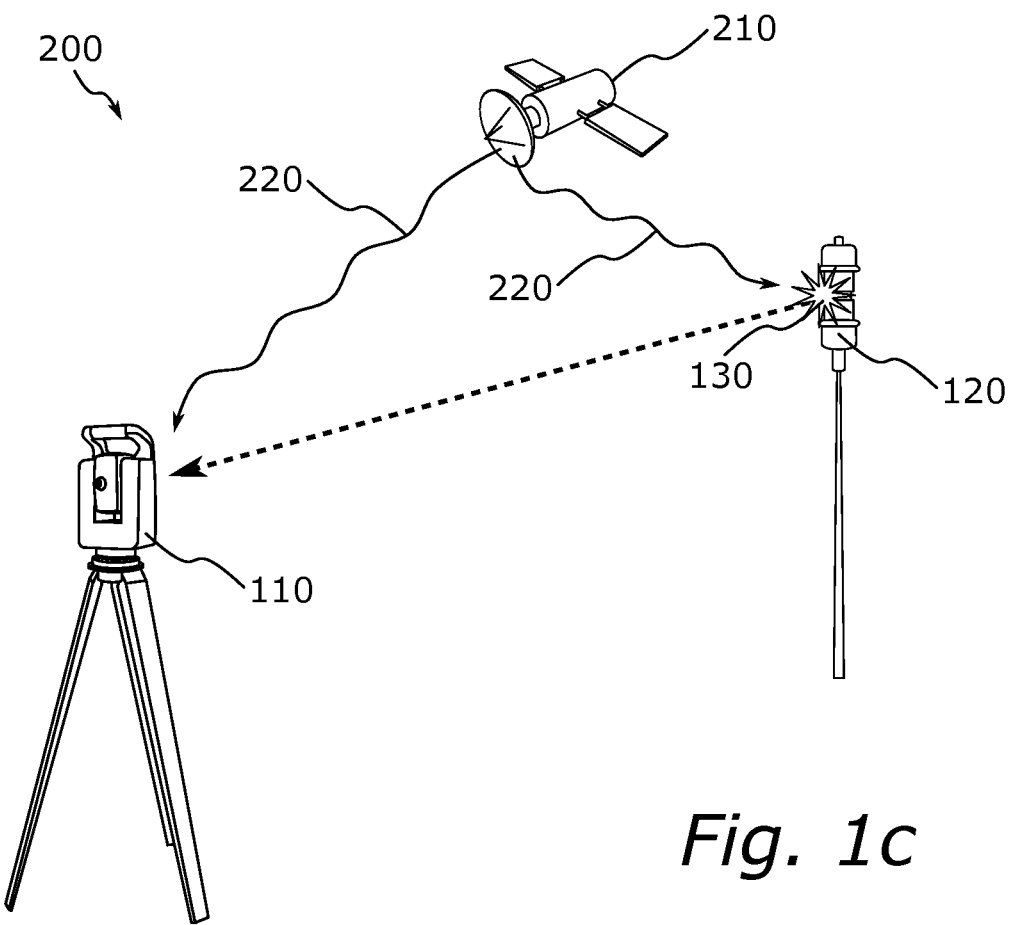
FIG. 1c illustrates a geodetic surveying system according to embodiments of the present disclosure.

With reference to FIGS. 1a, 1b and 1c, a geodetic instrument, a geodetic target and a surveying system according to some embodiments are described in the following.

FIG. 1a illustrates a geodetic instrument 110. The geodetic instrument 110 may for example be a total station, a scanner or a theodolite, and may include at least one imaging device 112 and a processing unit 116 configured to carry out at least parts of one or more methods as will be described later herein.

The imaging device 112 is configured to capture images within its field of view. The imaging device 112 may for example be a digital camera. The digital camera may be a still camera or a video camera. The camera may have a global shutter although it is also envisaged to use a camera with a rolling shutter or similar.

FIG. 1b illustrates a geodetic target 120. The geodetic target 120 may include at least one optical source 124 and a processing unit 126 configured to carry out at least parts of one or more methods as will be described later herein.

The at least one optical source 124 may be configured to emit an optical pulse 130, for example towards the geodetic instrument 110. The at least one optical source 124 may for example include a light emitting diode (LED), a laser diode or any other suitable light source which may emit pulses of light in a controlled manner. Although not illustrated in FIG. 1b, the geodetic target 120 is also envisaged to include driving circuitry for providing power to the at least one optical source 124, and connections which allows the processing unit 126 to control the at least one optical source 124 via e.g. such driving circuitry. To power the at least one optical source 124, the geodetic target 120 may include also a battery (not illustrated), although it is envisaged that power may be provided to the geodetic target 120 also from an external source through a wire or the like. If, for example, the geodetic target 120 is mounted on a vehicle or other structure, power may be provided to the geodetic target 120 from this vehicle or other structure.

FIG. 1c illustrates a surveying system 200 that includes a geodetic instrument 110 and at least one geodetic target 120.

The geodetic instrument 110 and the at least one geodetic target 120 may be synchronized with each other such that the operation of their constituents may be performed in a synchronized manner. For this purpose, both the geodetic instrument 110 and the geodetic target 120 may for example contain a clock. Such a clock may be a high accuracy clock having low or little drift. The clocks may be reset before operation of the geodetic surveying system 200, or during operation, when the geodetic instrument 110 and the geodetic target 120 both detect a common event.

Once synchronization of the geodetic instrument 110 and the geodetic target 120 is established, maintaining of the synchronization may be carried out by the clocks. If necessary, it is envisaged that synchronization may be reestablished by the sharing of another common event which may be detected by the geodetic instrument 110 and the geodetic target 120 in a similar manner as described above. If reestablishment of synchronization is possible to be performed often enough, it is envisaged that the maintaining of synchronization by the clocks may not be necessary as synchronization may then be established or reestablished whenever needed.

To agree on the common event, the geodetic instrument 110 and the geodetic target 120 may for example receive a signal that is indicative of the common event. Such a signal may for example be an optical signal, a radio signal or an electronic signal, and the common event may be indicated by a pulse included in the signal. The signal may also be more complex and consist of several pulses and/or codes, such as for example a global navigation satellite system (GNSS) signal. In FIG. 1c, such a third-party device is illustrated as a satellite 210, which transfers a signal 220 indicative of the common event that is received by both the geodetic instrument 110 and the geodetic target 120. In some embodiments, it is envisaged that for example one of the geodetic instrument 110 and the geodetic target 120 replaces the function of the third party device, and that a signal indicative of the common event is transferred from one of the geodetic instrument 110 and the geodetic target 120 to the other. It is also envisaged that one of the geodetic instrument 110 and the geodetic target 120 may receive the signal indicative of the common event from a third-party device, and then forward and/or relay this signal to the other device. If the signal indicative of the common event is a satellite signal, one or both of a geodetic instrument 110 and a geodetic target 120 may be equipped with e.g. a satellite receiving circuit and/or a satellite time reference module in order to receive and process the signal.

In some embodiments, the signal indicative of the common event may be a wireless signal, such as a radio signal or an optical signal, and the geodetic instrument and/or the geodetic target may be equipped with a suitable detector such as a radio antenna, a WiFi-, Bluetooth- or Zigbee-detector/receiver, and/or an optical pulse detector fabricated e.g. from Si, Ge and/or InGaAs. It may, however, also be envisaged that the signal indicative of the common event is transferred to the geodetic instrument 110 and/or geodetic target 120 using e.g. a fiber (through which e.g. an optical pulse may be received), a cable or a wire (through which e.g. an electrical signal/pulse may be received). This may be useful if, for example, the geodetic surveying system 200 is used in an area where reception of e.g. a radio signal from a satellite is not possible, for example underground or in areas of dense vegetation and/or with many and high buildings. If a fiber, cable or wire is used, the geodetic instrument and/or the geodetic target may be equipped with suitable connectors to which such a fiber, cable or wire may be attached.

Other methods of receiving the signal indicative of the common event may also be envisaged, such as for example receiving the signal as a radar pulse by the use of a suitable radar pulse receiver.

If using internal clocks, the geodetic instrument 110 and the geodetic target 120 may be connected (by e.g. a cable) to and synchronized with each other before operation, and then disconnected during operation itself as synchronization is then maintained by the internal clocks.

It is also envisaged that other methods of obtaining and maintaining synchronization is also possible. Such methods may, for example, include sensing the phase of the (e.g. 50 or 60 Hz) AC signal on the main power grid to maintain synchronization, or e.g. a broadcasted time signal from a nearby radio tower.

Figure 2A:
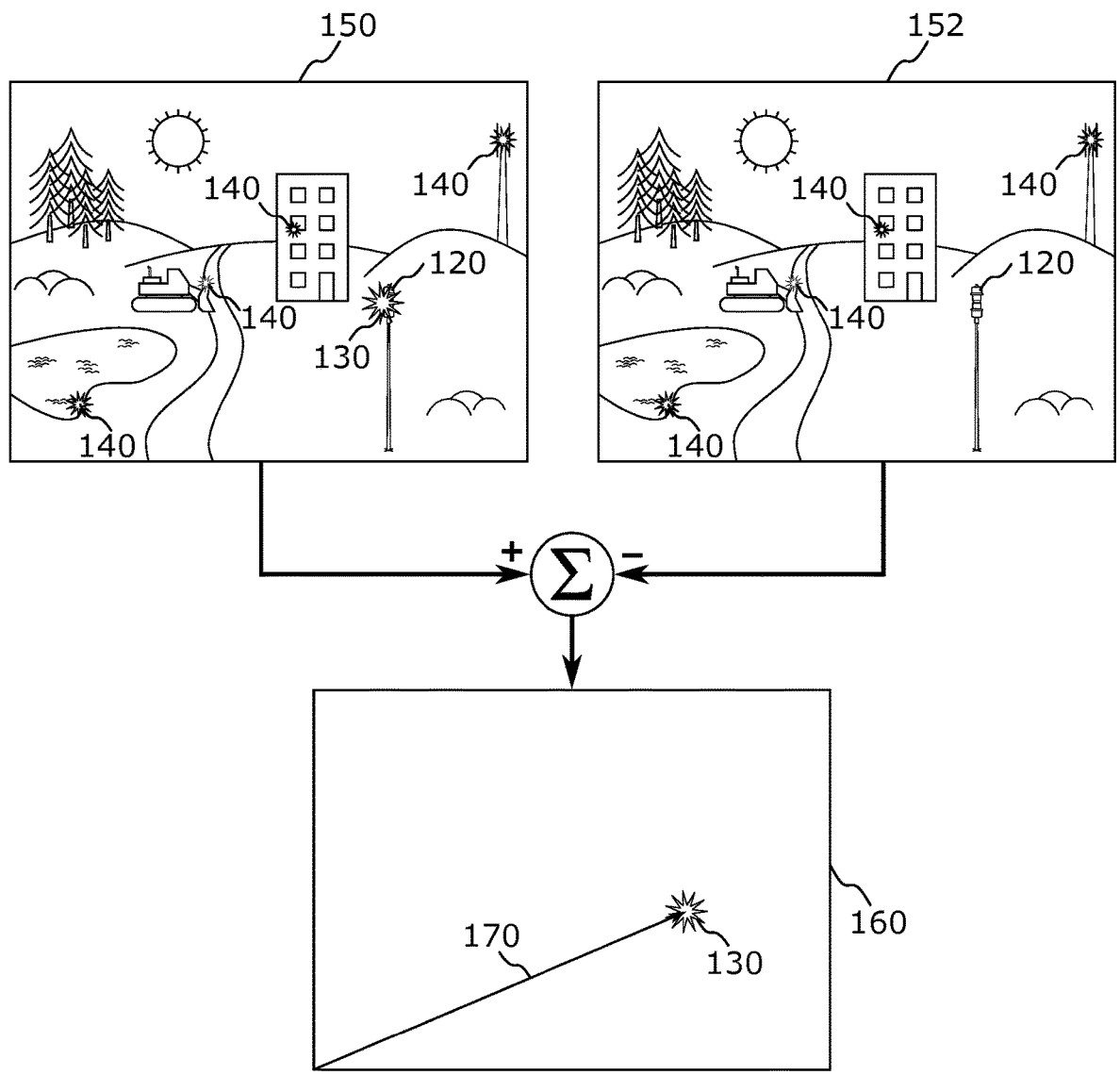
FIG. 2a illustrates a method for determining a direction to a geodetic target from a geodetic instrument according to one or more embodiments of the present disclosure.

With reference to FIG. 2a, a method for determining a direction to a geodetic target from a geodetic instrument according to one or more embodiments is described in more detail.

In FIG. 2a, a geodetic instrument 110 uses at least one imaging device 112 arranged at the geodetic instrument 110, to capture a first image 150. The first image 150 shows the scene that is to be surveyed. In this example, the scene contains a landscape including e.g. a lake, trees, a road, some hills, and also structures such as a building, a radio tower and a construction vehicle. In the scene is also a geodetic target 120 that emits an optical pulse 130 towards the geodetic instrument 110. In the captured first image 150, the optical pulse 130 emitted by the geodetic target 120 is visible, and also other optical interferences 140 such as solar reflections from the lake, light from a window in the building, light from the construction vehicle and light from the radio tower.

The geodetic instrument 110 also captures, using the at least one imaging device 112, a second image 152 covering the same scene. The second image also includes the geodetic target 120. The geodetic instrument 110 and the geodetic target 120 are synchronized, in a manner described earlier or similar, such that the optical pulse 130 is emitted by the geodetic target 120 concurrently with the capturing of the first image 150, and nonconcurrently with the capturing of the second image 152. This is why the optical pulse 130 emitted by the geodetic target 120 is visible in the first image 150 but not in the second image 152.

After having captured the first image 150 and the second image 152, the geodetic instrument 110 obtains a difference image 160. Here, the difference image 160 is obtained by subtracting the second image 152 from the first image 150. Since the first image 150 and the second image 152 are assumed to be similar except for the presence of the optical pulse 130 in the first image 150, the difference image 160 will contain no signatures or at least negligible signatures of the interfering lights. Based on the position 170 of the optical pulse 130 in the difference image 160, the geodetic instrument 110 may determine a direction to the geodetic target 120 from the geodetic instrument 110.

Figure 2B:
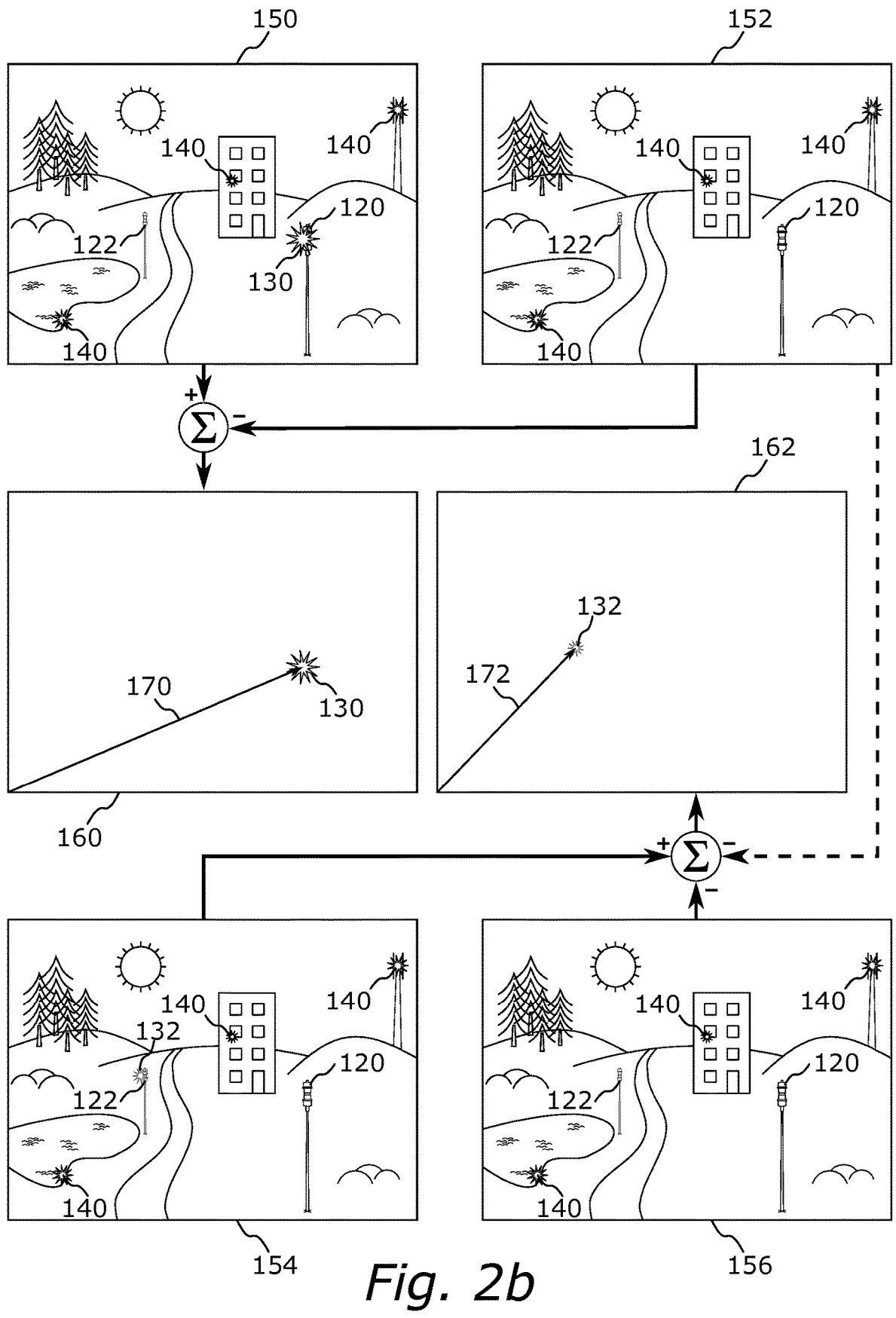
FIG. 2b illustrates a method for determining a direction to a geodetic target and also to a second geodetic target from a geodetic instrument according to one or more embodiments of the present disclosure.

With reference to FIG. 2b, a method for determining a direction to a geodetic target and also to a second geodetic target from a geodetic instrument according to one or more embodiments is described in more detail.

In FIG. 2b, a geodetic instrument 110 captures a first image 150 of a scene to be surveyed. Compared to the scene illustrated in FIG. 2a, the scene in FIG. 2b does not contain a construction vehicle. Instead, the scene as captured in the first image 150 contains a second geodetic target 122 located near the lake. Except for this difference, the two scenes in FIG. 2a and FIG. 2b are the same.

The geodetic instrument 110, the geodetic target 120 and the second geodetic target 122 are synchronized, in a manner described earlier or similar, such that the first image 150 contains an optical pulse 130 emitted by the geodetic target 120 only. The geodetic instrument 110 also captures a second image 152 in which no optical pulse is present. As described with reference to FIG. 2a, the geodetic instrument 110 may generate a difference image 160, identify the position 170 of the optical pulse 130 in the difference image 160, and determine a direction to the geodetic target 120 from the geodetic instrument 110 based on the position 170. As described earlier, a "position of an optical pulse in an image" may be interpreted as the position of data indicative of the optical pulse in the image.

In addition, the geodetic instrument 110, the geodetic target 120 and the second geodetic target 122 are synchronized such that the geodetic instrument 110 may capture a third image 154 concurrently with emission of an optical pulse 132 by the second geodetic target 122. The optical pulse 132 is emitted by the second geodetic target 122 nonconcurrently with the emission of the optical pulse 130 by the geodetic target 120. This is why the third image 154 does not contain the optical pulse 130 emitted by the geodetic target 120. The geodetic instrument 110 may also capture a fourth image 156 nonconcurrently with the emission of the optical pulse 132 by the second geodetic target 122, and obtain a second difference image 162 by subtracting the fourth image 156 from the third image 154. From the second difference image 162, the geodetic instrument 110 may determine, based on a position 172 of the optical pulse 132 emitted by the second geodetic target 122, a direction to the second geodetic target 122 from the geodetic instrument 110.

As indicated by the dashed arrow in FIG. 2b, instead of capturing the fourth image 156 the geodetic instrument may also create the second difference image by subtracting the second image 152 from the third image 154, as long as the optical pulse 132 emitted by the second geodetic target 122 is not present in the image subtracted from the third image 154. It is also envisaged that the geodetic instrument may create the second difference image by subtracting the first image 150 from the third image 154. Also, it is envisaged that the difference image 160 may be created by subtracting the third image 154 from the first image 152. As long as a pulse from a geodetic target is present only in one of two images, the two images may be subtracted to extract the position of the pulse in the resulting difference image.

With reference to FIGS. 3a-3e, examples of how to capture images and emit optical pulses in accordance with embodiments of the present disclosure are described in more detail.

Figure 3A:
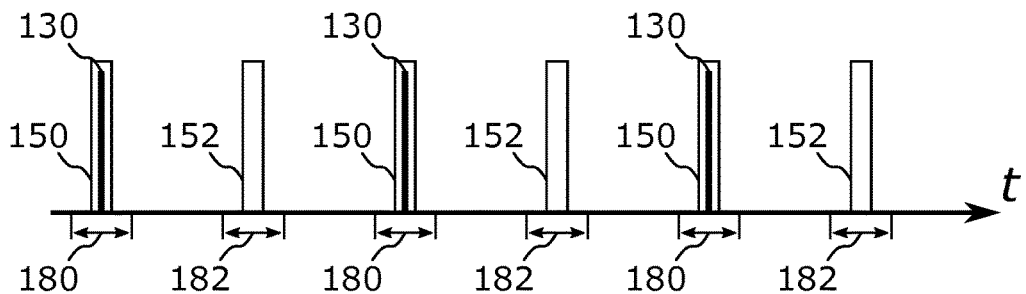

In FIG. 3a, the geodetic instrument 110 captures a plurality of first images 150 and a plurality of second images 152, and the geodetic target 120 emits a plurality of optical pulses 130. The plurality of first images 150 and the plurality of second images 152 are captured in an interleaved fashion, such that a capturing of a first image 150 is chronologically followed by a capturing of a second image 152 and vice versa.

The geodetic instrument 110 and the geodetic target 120 are synchronized such that each optical pulse 130 is emitted concurrently with the capturing of a first image 150, and nonconcurrently with the capturing of a second image 152. In the example, the spacing in time between each capture is equal for all images. A set of non-overlapping time slots, including first time slots 180 and second time slots 182 are allocated and spaced equally, and the emission of an optical pulse 130 and a capturing of a first image 150 takes place in one of the first slots 180, and a capturing of a second image 152 takes place in one of the second slots 182. In the example, the distances in time between e.g. a second time slot 182 and the immediately preceding first time slot 180 and the immediately succeeding first time slot 180 are equal. Phrased differently, the geodetic instrument 110 and the geodetic target 120 are synchronized such that optical pulses 130 are emitted by the geodetic target 120 with half the image capturing rate of the geodetic instrument 110, such that an optical pulse 130 is present in every second captured image (i.e. in each first image 150). It will be appreciated that although it is in this particular example shown that the time slots of one kind are equally spaced in time, another distribution of the time slots over time may be used as long as the geodetic instrument and the geodetic target are informed of the allocation of the time slots. As described earlier herein, information indicative of the allocation of the time slots may be transferred to the geodetic instrument 110 and the geodetic target 120. The information indicative of the allocation may be transferred using e.g. a wireless link, a wire or cable, or by any other suitable means. The allocation of time slots may for example follow that of a time division multiple access (TDMA) scheme.

In FIG. 3b, the first time slots 180 and the second time slots 182 are not evenly spaced, but instead allocated such that e.g. the distance in time between a second time slot 182 and the immediately preceding first time slot 180 is shorter than the distance in time between a second time slot 182 and the immediately succeeding first time slot 180. The optical pulses 130 are emitted, and the first images 150 are captured, in the first time slots 180, and the second images 152 are captured in the second time slots 182.

In FIG. 3c, the first time slots 180 and the second time slots 182 are allocated such that e.g. the distance in time between a second time slot 182 and the immediately preceding first time slot 180 is longer than the distance in time between a second time slot 182 and the immediately succeeding first time slot 180. Like in FIGS. 3a and 3b, the optical pulses 130 are emitted and the first images 150 are captured in the first time slots 180, and the second images 152 are captured in the second time slots 182.

In FIGS. 3b and 3c, the reduced distance in time between the capturing of a first image 150 and a second image 152 may allow to reduce the impact of e.g. a moving geodetic target 120, or a non-static background of the scene to be surveyed.

Figure 3D:
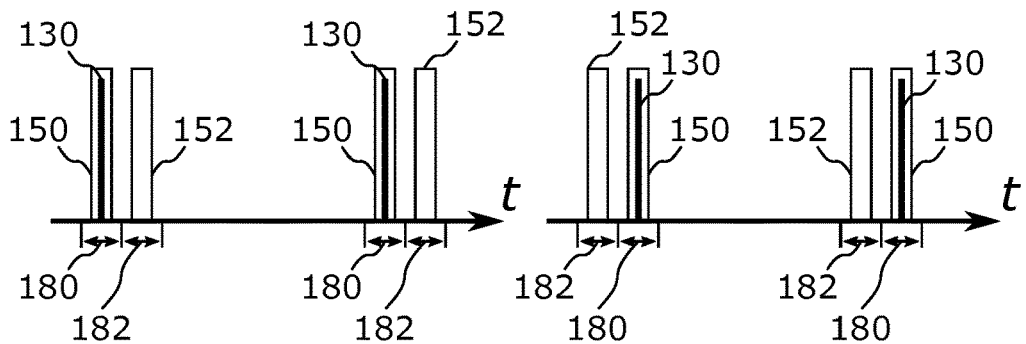
Figure 3D:
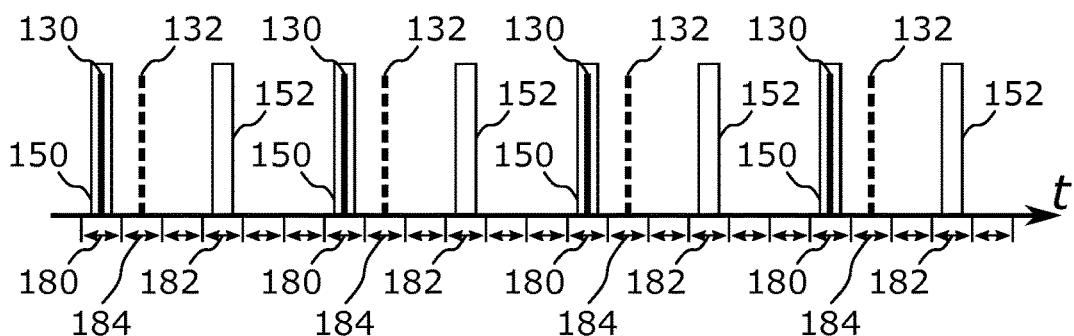

In FIG. 3d, a second geodetic target 122 is configured to emit a plurality of optical pulses 132. The second geodetic target 122 is synchronized with the geodetic instrument 110 and the geodetic target 120 such that the optical pulses 132 emitted by the second geodetic target 122 are nonconcurrent with the emission of the optical pulses 130 by the geodetic target 120, or with the capturing of the first images 150 and the second images 152 by the geodetic instrument 110. In FIG. 3d, the set of non-overlapping time slots includes a plurality of third time slots 184 allocated in between each chronological pair of a first time slot 180 and the immediately succeeding second time slot 182. The optical pulses 132 are emitted by the second geodetic target 122 in the third time slots 184, and may therefore interfere less, or not at all, with the operation of the geodetic instrument 110 and its ability to track the optical pulses 130 emitted by the geodetic target 120. It is also envisaged that more optical pulses, e.g. from a third geodetic target (not shown) that are synchronized with the geodetic instrument 110, the geodetic target 120 and the second geodetic target 122 may be emitted nonconcurrently in a plurality of fourth time slots allocated e.g. between each chronological pair of a third time slot 184 and the immediately succeeding second time slot 182, or for example between each chronological pair of a second time slot 182 and the immediately succeeding first time slot 182.

Figure 3E:
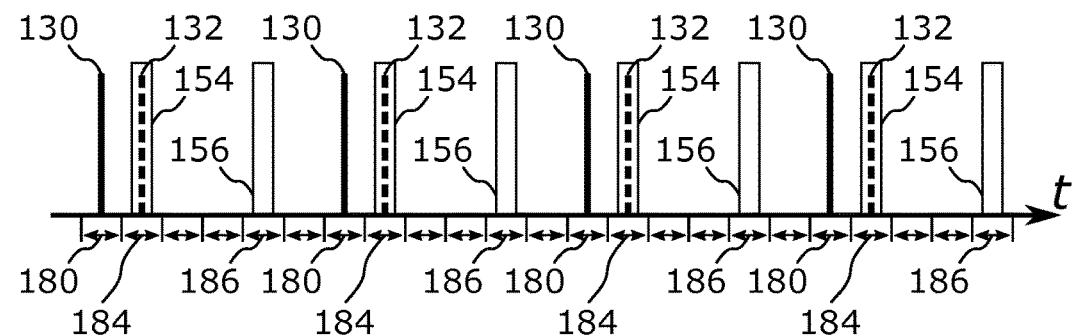

In FIG. 3e, the geodetic instrument 110 is configured to capture a plurality of third images 154 concurrently with the emission of optical pulses by the second geodetic target 122 and nonconcurrently with the emission of optical pulses 130 by the geodetic target 120, and a plurality of fourth images 156 nonconcurrently with the emission of any pulse 130 or 132 by the geodetic target 120 or the second geodetic target 122. The third images 154 are captured in the third time slots 184, and the fourth images 156 are captured in a plurality of fourth time slots 186 allocated in the set of non-overlapping time slots.

In FIGS. 3a, 3b, 3c, 3d and 3e, the images (such as images 150, 152, 154 or 156) are illustrated as having extensions (or durations) in time (i.e. the width of the bars) which are longer than those of the optical pulses (such as optical pulses 130 or 132). It will be appreciated that the figures are provided for illustrative purposes only, and it may be envisaged that at least a frame exposure time for a certain image is shorter than a duration of the pulse that is to be captured. In these figures, an overlap between an optical pulse and an image illustrates that the image is captured such that it contains at least part of the optical pulse.

In this example setup, the geodetic instrument 110 may track the optical pulses 132 emitted by the second geodetic target 122, while the optical pulses 130 emitted by the geodetic target 120 may interfere less, or not at all, with the operation of the geodetic instrument 110.

Like described earlier with reference to e.g. FIG. 2b, it is envisaged that the fourth images 156 may be replaced e.g. by the second images 152, or by e.g. the first images 150 as long as these images are not captured concurrently with the emission of any optical pulse 132 by the second geodetic target 122.

One or more methods as described above may increase the stability of tracking of geodetic targets by a geodetic instrument and also offer e.g. more flexibility in terms of measurement distance. By combining synchronization of the geodetic instrument and the geodetic target with obtaining a difference image from two images of the geodetic target captured by the geodetic instrument, the duration of the pulse may be reduced and cross-talk between multiple geodetic targets avoided or at least reduced. This allows for an improved way of determining a direction to one or many geodetic targets from a geodetic instrument.

Reducing the pulse duration may allow for the maximum amplitude of the pulse to be increased without surpassing the maximally allowed power consumption (i.e. not exceeding the thermal limit of the optical source used to emit the optical pulses). Increasing the amplitude of the pulse may allow for the pulse to travel further before becoming too weak to be detected by an imaging device, and for geodetic targets to be tracked at a longer distance. Also, by using an active geodetic target with its own optical source, in contrast to a passive geodetic target which relies on reflecting back light generated and sent from somewhere else, the distance an optical pulse travels before reaching the geodetic instrument may be halved. As the optical power per unit area may be assumed to be reduced with the square of the distance the pulse has travelled, the active tracking distance may be up to four times longer since the optical pulse only has to travel from the geodetic target to the geodetic instrument (and not e.g. from the geodetic instrument to the geodetic target and then back to the geodetic instrument, as in the case when passive targets are used).

By synchronizing the geodetic instrument and one or more geodetic targets, the confidence that the correct geodetic target is measured may be increased. With proper synchronization, the geodetic instrument may be confident that a pulse detected within a specific time slot originates from a specific target that was synchronized to emit its optical pulse within that specific time slot. Likewise, knowledge about the allocation of time slots may help the geodetic instrument to identify a geodetic target based on in which time frame the geodetic instrument emitted the optical pulse.

By taking a difference image between one image captured concurrently with the emission of an optical pulse by a geodetic target, and one image captured nonconcurrently with the emission of any optical pulse by the geodetic target, false locks due to e.g. reflections or interfering light from other sources may be eliminated or at least partly eliminated. An interfering light that is static enough to be present in both images used to obtain the difference image may be cancelled out and thereby not allowed to confuse the geodetic instrument.

By synchronization, e.g. by allocation of non-overlapping time slots, the operation of the geodetic instrument may be improved even when multiple geodetic targets are present. The geodetic instrument may discriminate more accurately between multiple targets within its field of view, based on the timing of when an optical pulse is emitted and on which geodetic target that is allowed/configured to emit optical pulses at that specific moment in time. In this way, multiple targets may be tracked and/or measured by the geodetic instrument at the same time.

In the context of the present disclosure, the wording geodetic instrument, geodetic scanner, measuring instrument, total station, survey unit or surveying instrument may be used interchangeably.

Herein, a third-party device may be for example an additional geodetic instrument or an additional geodetic target. The third-party device may form part of a geodetic surveying system, and be for example an external clock or time reference combined with means for transmitting a signal indicative of a common event to the geodetic instrument and the geodetic target. The third-party device may also be e.g. a satellite, or a radio tower broadcasting a time signal.

A processing unit may include, by way of example, a general purpose processor, a special purpose processor, a conventional processor, a digital signal processor (DSP), a plurality of microprocessors, one or more microprocessors in association with a DSP core, and any other type of integrated circuit (IC). Examples of integrated circuits may include circuits for receiving and/or processing satellite navigation signals or time signals, circuits for controlling and providing power to e.g. optical sources and imaging devices, and circuits for receiving and/or processing imaging data from imaging devices (such as graphical processing units, GPUs) or similar.

A processing unit may be configured to contain instructions that, when executed, causes the processing unit to, by itself and/or by directing other components that are also included, perform one or more methods according to any embodiments described herein. If a method involves the operation of several devices, such as a geodetic instrument and a geodetic target, a processing unit located in each of the devices may be responsible for performing the parts of a method which involves the device in which the processing unit is located.

The steps of any method disclosed herein do not necessarily have to be performed in the exact order disclosed, unless explicitly stated to the contrary.

The person skilled in the art realizes that the present disclosure is by no means limited to the embodiments described above. On the contrary, many modifications and variations are possible within the scope of the appended claims.

Although features and elements are described above in particular combinations, each feature or element may be used alone without the other features and elements or in various combinations with or without other features and elements.

Further, although applications of the geodetic instrument and geodetic target has been described with reference to a geodetic surveying system, the present disclosure may be applicable to any systems or instruments in which a target or object has to be detected in the vicinity of such a geodetic instrument.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. Method for determining a direction to a geodetic target from a geodetic instrument, the method comprising:
   emitting, from the geodetic target, an optical pulse towards the geodetic instrument;
   capturing, using at least one imaging device arranged at the geodetic instrument, a first image and a second image of the geodetic target;
   synchronizing the geodetic instrument and the geodetic target for emitting the optical pulse concurrently with the capturing of the first image, and for emitting the optical pulse nonconcurrently with the capturing of the second image;
   obtaining a difference image between the first image and the second image; and
   determining, based on a position of the optical pulse in the difference image, the direction to the geodetic target from the geodetic instrument.

2. The method of claim 1, wherein the synchronizing includes receiving a signal indicative of a common event.

3. The method of claim 2, wherein the signal indicative of the common event comprises at least one of an electromagnetic signal, an electric signal, a GNSS code, a single electric pulse, or a single electromagnetic pulse.

4. The method of claim 2, wherein the signal indicative of the common event is received by the geodetic instrument from the geodetic target, wherein the signal indicative of the common event is sent to the geodetic target from the geodetic instrument, or wherein the signal indicative of the common event is received by the geodetic target and the geodetic instrument from an external device.

5. The method of claim 1, wherein the first image and the second image are captured within a time interval corresponding to at most one frame readout time plus two times a frame exposure time of said at least one imaging device.

6. The method of claim 1, wherein the first image is captured by a first imaging device and the second image is captured by a second imaging device.

7. The method of claim 1, wherein the capturing of the first image and the second image is repeated to capture a plurality of first images and a plurality of second images in an interleaved fashion.

8. The method of claim 7, wherein:
   the plurality of first images are captured at a rate corresponding to a rate at which the geodetic target is configured to emit a plurality of subsequent optical pulses,
   the plurality of first images and the plurality of second images are captured at a combined rate corresponding to twice the rate at which the geodetic target is configured to emit a plurality of subsequent optical pulses, or
   the plurality of first images and second images are captured at a combined rate corresponding to at least 60 Hz.

9. The method of claim 1, wherein a frame exposure time of said at least one imaging device is shorter than or equal to a duration of the optical pulse emitted by the geodetic target.

10. The method of claim 1, further comprising:
synchronizing the geodetic instrument with the geodetic target and a second geodetic target configured to identify itself by emitting an optical pulse for capturing the first image nonconcurrently with emission of the optical pulse by the second geodetic target.

11. The method of claim 10, further comprising:
capturing, using the at least one imaging device arranged at the geodetic instrument, a third image of the geodetic target and the second geodetic target;
synchronizing the geodetic instrument with the geodetic target and the second geodetic target for capturing the third image concurrently with emission of the optical pulse by the second geodetic target and nonconcurrently with emission of the optical pulse by the geodetic target;
obtaining a second difference image between the third image and an image captured nonconcurrently with the emission of the optical pulse by the second geodetic target; and
determining, based on a position of the optical pulse emitted by the second geodetic target in the second difference image, a direction to the second geodetic target from the geodetic instrument.

12. The method of claim 11, wherein synchronizing the geodetic instrument with the geodetic target and the second geodetic target includes:
establishing a time reference common to the geodetic instrument, the geodetic target and the second geodetic target; and
obtaining information about allocation of a third time slot in a set of non-overlapping time slots,
wherein the optical pulse is emitted by the second geodetic target within the third time slot.

13. The method of claim 12, wherein the third image of the geodetic target and the second geodetic target is captured by the geodetic instrument within the third time slot.

14. The method of claim 1, wherein synchronizing the geodetic instrument with the geodetic target includes:
establishing a time reference common to the geodetic instrument and the geodetic target; and
obtaining information about allocation of a set of non-overlapping time slots comprising at least a first time slot and a second time slot,
wherein the optical pulse is emitted by the geodetic target within the first time slot, and
wherein the first image and the second image are captured by the geodetic instrument within the first time slot and the second time slot, respectively.

15. The method of claim 1, further comprising:
determining, based on the position of the optical pulse emitted by the geodetic target in the difference image, a position of the geodetic target relative to the geodetic instrument.

16. A geodetic instrument, comprising:
at least one imaging device configured to capture at least a first image and a second image of a geodetic target configured to identify itself by emitting an optical pulse, and
a processing unit, configured to:
synchronize the at least one imaging device to capture the first image concurrently with emission of the optical pulse by the geodetic target, and to capture the second image nonconcurrently with emission of the optical pulse by the geodetic target;
receive, from the at least one imaging device, the first image and the second image;
obtain a difference image between the first image and the second image, and
determine, based on a position of the optical pulse emitted by the geodetic target in the difference image, a direction to the geodetic target from the geodetic instrument.

17. The geodetic instrument of claim 16, further comprising a receiver configured to receive a signal indicative of a common event, wherein the processing unit is configured to synchronize the at least one imaging device based on the received signal indicative of the common event.

18. The geodetic instrument of claim 17, wherein the receiver is a GNSS receiver, and/or wherein the at least one imaging device is a digital camera.

19. A geodetic target configured to identify itself to a geodetic instrument by emitting an optical pulse, comprising:
an optical source configured to emit the optical pulse, and
a processing unit configured to synchronize the optical source to emit the optical pulse concurrently with a capturing of a first image by the geodetic instrument, and nonconcurrently with the capturing of a second image by the geodetic instrument.

20. The geodetic target of claim 19, further comprising a receiver configured to receive a signal indicative of a common event, wherein the processing unit is configured to synchronize the optical source based on the received signal indicative of a common event.

* * * * *